Aug. 8, 1939.  H. BILLER  2,168,788
MECHANICALLY MOVING TOY
Filed Aug. 26, 1938
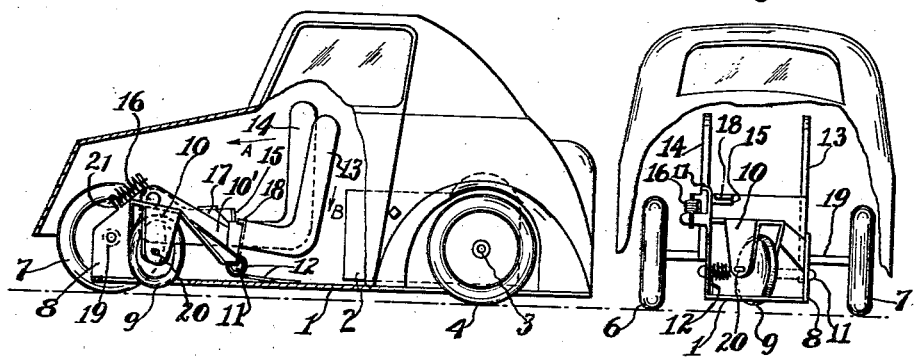
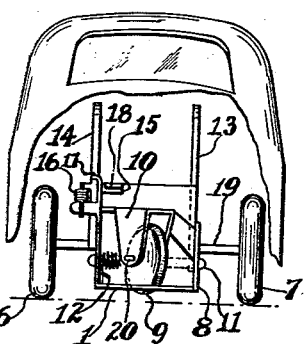
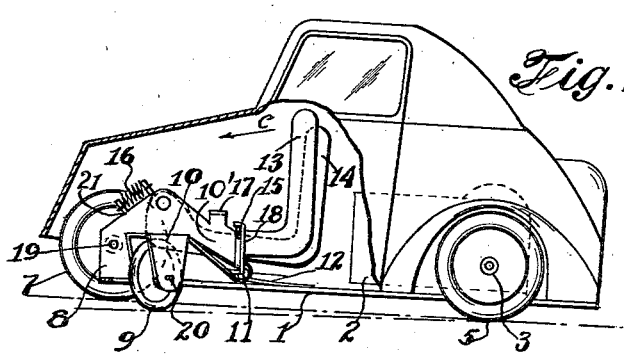
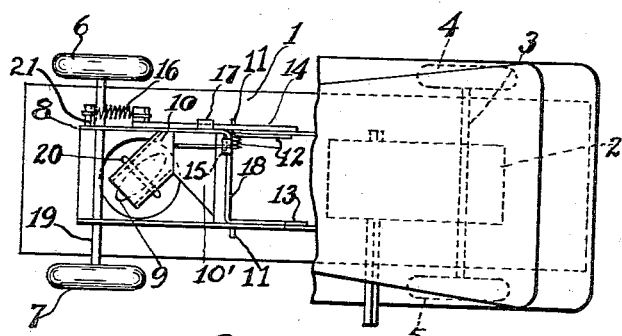
INVENTOR
Hans Biller
BY George Benjamin
ATTORNEY Patented Aug. 8, 1939

2,168,788

UNITED STATES PATENT OFFICE 2,168,788

MECHANICALLY MOVING TOY

Hans Biller, Nuremberg, Germany, assignor to Transatlantic Factors Inc., New York, N. Y.

Application August 26, 1938, Serial No. 226,893

7 Claims. (Cl. 46—211)

My invention relates to mechanically moving toys, particularly to such toys which are provided with driving means of any kind for instance, with a clockwork and are intended to follow certain predetermined paths when moving. The invention is applicable to all kinds of such toys. The outer form is in no way limited; it may consist of a vehicle, for instance a car or an airplane, an animal, a person, etc.

One object of my invention is a mechanically moving toy which is provided with two or more sets of moving elements, each of them giving the toy a certain path of movement and which is further mounted with control means by which the various sets of moving elements can be alternatively put into action, thus enabling a person playing with the toy to direct it in various paths.

A preferred embodiment of my invention consists therein that two control levers are provided which can be alternatively operated. If one control lever is operated one set of moving elements are put into action and the other sets which were previously active are released. If the second control lever is operated another set of moving elements is actuated and the aforementioned moving elements are released.

Other and further objects and advantages of the invention will be hereinafter set forth and the novel features thereof defined by the appended claims.

In the accompanying drawing an embodiment of the invention is shown.

Fig. 1 is a side view of an automobile according to the invention, the parts being partly broken away.

Fig. 2 shows the same side view as Fig. 1 but the control mechanism is in another position.

Fig. 3 is a plan view of an automobile according to Fig. 1.

Fig. 4 shows a front view of an automobile according to Fig. 1.

1 is the base or bottom plate of the chassis of an automobile on which a clockwork 2 is mounted. This clockwork can be arranged in any conventional manner and therefore needs no special description. The body of the automobile is of no importance for the invention; it can be of any kind. 3 is the rear axle on which the rear wheels 4 and 5 are mounted. The wheel 4 is idle on the axle and the wheel 5 is driven by the clockwork. The front wheels 6 and 7 of the car are mounted on an axle 19 which is held by a support 8 which may form part of the base plate 1.

Besides these normal wheels of a car a fifth wheel 9 is provided the position of which determines the course which the car follows. This wheel is adapted to take an upper position and a lower position. In the upper position it is out of contact with the ground and the car rests on its front wheels and is running straight ahead. In its lower position it touches the ground and lifts both front wheels from the ground. The course of the car is then determined by the position of this fifth wheel, which I will call a "control wheel" in the following specification. The control wheel 9 is rotatably mounted on an axle 20 which is in turn supported by a second support 10. This support has a flange-like extension 10' and journals 11 by which the support 10 is pivotally connected with the stationary support 8. A coil spring 12 is attached to the second support 10 in such a manner that it always tends to turn the second support in the direction indicated by the arrow A. However this coil spring can be replaced by any other kind of spring or other suitable means. Rigidly connected to or being an integral part of the flange-like extension 10' of the second support is a control lever 13 which is intended to pivot downward the support 10 with the control wheel 9 in the direction indicated by the arrow B against the strength of the spring 12.

Beside the control lever 13 a second control lever 14 is provided which is pivotally connected with the support 8 by means of a pin. A spring 16 which is connected by one end with the control lever 14 and the other end with projection 21 of the support 8 tends to rotate the lever 14 in a direction indicated by arrow C. The upward rotation of the lever is limited by a stud 17 at the side of the support 8. The control lever 14 cooperates with the control lever 13 and the wheel support 10 connected to that control lever by means of a projection 15 of lever 14 and a stud 18 being a part of the lever 13 or the flange-like extension 10'.

The playing with the toy car is effected as follows.

First the car is wound up in the usual manner and then set on the ground. If the two control levers 13 and 14 are in the positions shown in Fig. 1 the edge of the element 15 rests against the side of the element 18 thus preventing the control lever 13 and the wheel support 10 connected with it from following the pull of the spring 12 which tends to pivot the wheel support downwards. Consequently the wheel 9 is above the ground and the direction the car takes is determined by the front wheels 6 and 7. To change the direction of the car it is necessary only to push the control lever 14 downward. Then the element 15 slides over the upper edge thus releasing the control lever 13, which now turns downward until it comes into the position shown in Fig. 2. In this position the wheel 9 is resting on the ground and the wheels 6 and 7 are lifted. Consequently the position of the control wheel 9 determines the direction of the car. In the embodiment which is illustrated in the drawing the car will now run in circles. If the direction of the car is to be changed again, the lever 13 is pushed downward. Consequently the element 15 is removed from the element 18 and the lever 14 goes back into its upper position by the effect of the spring 16. In this position the element 15 again rests against the side of the element 18 thus preventing the lever 13 and the support 10 from going back into their lower position.

The inventor does not limit himself in this invention to any particular construction or form of the toy to which the invention is applied. For instance, it is possible to provide another position of the front wheels and the control wheel as indicated. Further, three or more control levers can be provided following the same principle as shown in the description effecting various paths of the toy vehicle. It is intended that all matter contained in the above description or shown in the accompanying drawing shall be interpreted as illustrative and not in a limited sense. Having thus described my invention what I claim as new and desire to secure by Letters Patent is:

1. A mechanically moving toy comprising a group of wheels adapted to give the toy a certain path of movement, at least one control wheel adapted to give the toy another path of movement, a support for said control wheel adapted to be pivoted upward and downward, a spring which tends to turn the support with the control wheel downward, blocking means adapted to block the support in its raised position, a control lever connected with the support and adapted to pivot the support from its lowered position into its raised blocked position, a second control lever pivotally attached to a stationary part of the toy and adapted to release the blocking means.

2. A mechanically moving toy comprising a group of wheels determining the path of the toy if in action, at least one control wheel, adapted to give the toy a certain path of movement, a support for said control wheel adapted to be pivoted upward and downward, a spring which tends to turn the support with the control wheel downward, a control lever connected with said support and adapted to turn the support from its lowered position into its raised position, a projection provided on the support, a second lever pivotally attached to a stationary part of the toy, a projection provided on said second lever and adapted to engage the projection provided on the support in the raised position of the support thus blocking the support in that position and adapted to be released by operating the second control lever.

3. A mechanically moving toy comprising a group of wheels adapted to give the toy a certain path of movement, at least one control wheel adapted to give the toy another path of movement, a support for said control wheel adapted to be pivoted upward and downward, a spring tending to turn said support with said control wheel downward, a control lever integral with said support and adapted to turn said support from its lowered position into its raised position against the strength of said spring, a projection provided on said support, a second lever pivotally secured to a stationary part of the toy, a spring tending to turn said second lever upward, a projection provided on said second lever and adapted to engage the projection of said support when said support is in its raised position thus blocking said support in that position and adapted to be released by operation of said second control lever.

4. A mechanically moving toy comprising a group of wheels adapted to give the toy a certain path of movement, at least one control wheel adapted to give the toy another path of movement, a support for said control wheel, adapted to be pivoted upward and downward, a spring tending to turn said support with said control wheel downward, a control lever integral with said support and adapted to turn said support from its lowered position into its raised position against the strength of said spring, a projection provided on said support, a second lever pivotally secured to a stationary part of the toy, a spring tending to turn the second lever upward, a projection provided on said second lever and adapted to abut against the projection of said support in the raised position of said support thus blocking said support in that position and adapted to slide under said projection if said second control lever is operated thus releasing said support.

5. A mechanically moving toy comprising a group of wheels adapted to give the toy a certain path of movement, at least one control wheel adapted to give the toy another path of movement, a support for said control wheel, said support adapted to be pivoted upward and downward, a spring tending to turn said support with said control wheel downward, a control lever integral with said support and adapted to turn said support from its lowered position into its raised position against the strength of said spring, a projection provided on said support, a second lever pivotally secured to a stationary part of the toy, a spring connected with one end with the control lever and with the other end with a stationary part of the toy and tending to turn said second lever upward, said spring adapted to abut against the projection of said support in the raised position of said support thus blocking said support in that position and adapted to slide under said projection if said second control lever is operated thus releasing said support.

6. A toy vehicle comprising an automobile body, a chassis, two front wheels, two rear wheels, said wheels adapted to give the toy a certain path of movement, at least one control wheel intermediate between the front and rear wheels, said control wheel adapted to give the toy another path of movement if in action, a support for said control wheel adapted to be pivoted upward and downward, a spring tending to turn said support with said control wheel downward, blocking means adapted to block said support in its raised position, a control lever connected with said support and adapted to pivot said support from its lowered position into its raised blocked position, a second control lever pivotally attached to a stationary part of the toy and adapted to release said blocking means.

7. A toy vehicle comprising an automobile body, a chassis, two front wheels, two rear wheels, said wheels determining a certain path of movement of the toy vehicle, at least one control wheel adapted to give the toy another path of movement if in action, a support for said control wheel adapted to be pivoted upward and downward, a spring tending to turn said support with said control wheel downward, a control lever connected with said support and adapted to turn said support from its lowered position into its raised position, a projection provided on said support, a second lever pivotally attached to a stationary part of the toy, a spring tending to turn said second lever upward, a projection provided on said second lever and adapted to engage the projection of said support in the raised position of said support thus blocking the support in that position and adapted to be released by operation of said second control lever.

HANS BILLER.